TIMING FOR REGENERATIVE REPEATERS

Filed Nov. 18, 1960

INVENTOR
W. M. GOODALL
BY
ATTORNEY

INVENTOR
W. M. GOODALL
BY J. W. Adams, Jr.
ATTORNEY

United States Patent Office 3,085,200
Patented Apr. 9, 1963

3,085,200
TIMING FOR REGENERATIVE REPEATERS
William M. Goodall, Atlantic Township, Monmouth County, N.J., assignor to Bell Telephone Laboratories, Incorporated, New York, N.Y., a corporation of New York
Filed Nov. 18, 1960, Ser. No. 70,219
15 Claims. (Cl. 325—13)

This invention relates to regenerative repeaters and, more particularly, to timing circuits for self-timed regenerative repeaters of the type employed in pulse code modulation and similar communication systems.

As the pulse information signal generated at a transmitter traverses a communication system of the kind contemplated herein, it is regenerated from time to time at repeater stations located along the transmission path. Due to noise and environmental changes encountered during transmission, small variations develop in the time intervals between adjacent pulses resulting in a phenomenon commonly called "time jitter." If these variations become too large, information pulses initially present in the message signal may be lost or spurious pulses created. The true character of the code is thereby destroyed and, hence, the information becomes distorted.

Jitter, since it represents a potential degradation of the information signal, is undesirable and steps must normally be taken to curb its accumulation during transmission through the system. An approach which has proved successful to check the accumulation of jitter during transmission in pulse code communication systems is described in W. M. Goodall Patent 2,502,942 issued April 4, 1950. Apparatus disclosed therein, and contemplated for use at repeater stations, synchronizes the phase of a local source of timing pulses occurring at the basic repetition rate of the system to the average, taken over a long period of time, of the incoming pulse information signal. High frequency jitter of the incoming pulse information signal is thus excluded from the timing pulses which are in turn employed to retime the incoming pulse information signal, thereby reducing the jitter which has accumulated thereon. Such averaging is achieved by applying a control signal representative of the phase difference between the incoming signal pulses and the timing pulses as correction to the source of timing pulses through a path having a low-pass frequency characteristic.

In the system referred to above, time misalignments occur in varying amounts between the peaks of information pulses applied to the regenerator and the peaks of their respective timing pulses. This results from the fact that timing pulses are synchronized to the average of the pulse information signal. If the high frequency jitter of the incoming information signal is appreciable, the misalignment may be sufficiently large to preclude regeneration of some signal pulses or to generate pulses which did not previously exist, introducing another source of error into the system.

It is, therefore, the object of the present invention to reduce the amount of error developed in regenerating pulse code signals during transmission of information.

In accordance with the above object, a repeater employing phase synchronization like that taught in Goodall Patent 2,502,942 is provided with an additional correction circuit to vary the delay undergone by the incoming pulse information signal prior to being applied to the regenerator in a sense to bring the information pulses into alignment with the timing pulses.

Generally, a given characteristic, namely the phase, of the incoming pulse information signal is compared with a standard signal. A control signal, representative of the difference, is applied simultaneously through a path having a low-pass frequency characteristic to correcting means for the given characteristic of the standard signal and through a path having a high-pass frequency characteristic to correcting means for the given characteristic of the pulse information signal. Thus, if the frequency characteristics of the two control paths are complementary, as occurs when they have coincident cut-off frequencies, the complete spectrum of the control signal is utilized. The low frequency variations of the given characteristic of the standard signals are corrected and the high frequency variations of the given characteristic of the pulse information signal are corrected, bringing the standard and information signals into alignment.

In a specific embodiment, an information signal path interconnects a source of pulse information signals and an output circuit. The signal path comprises a variable delay device, means for sampling the information signal, and a regenerator, all connected in tandem in the order recited. A sample of the information signal is compared in phase with a sample of the output from a source of timing pulses, the standard signals referred to heretofore. A unitary signal, representative of the phase difference, is developed and applied through a first feedback circuit including a low-pass filter to the source of timing pulses, correcting the phase of the output thereof. The error or correction signal resulting from the phase comparison is simultaneously applied through a second feedback circuit including a high-pass filter to the variable delay device to control the amount of delay introduced into the signal path, thereby reducing the phase difference or misalignment between the information pulses and the timing pulses. Preferably, the cut-off frequencies of the filters are coincident.

The timing pulses are utilized to regulate the regeneration of the delayed information signal. Consequently, alignment is achieved between the signal pulses to be regenerated and the timing pulses; the phase of the timing pulse train is defined by the pulse information signal averaged over a long period of time due to the low frequency selectivity of the first feedback circuit; and interaction between the control afforded by the two feedback circuits is obviated by virtue of the complementing frequency characteristics of these feedback circuits.

The invention may be more fully understood by reference to the following detailed description taken in connection with the drawings, in which.

Figure 1:
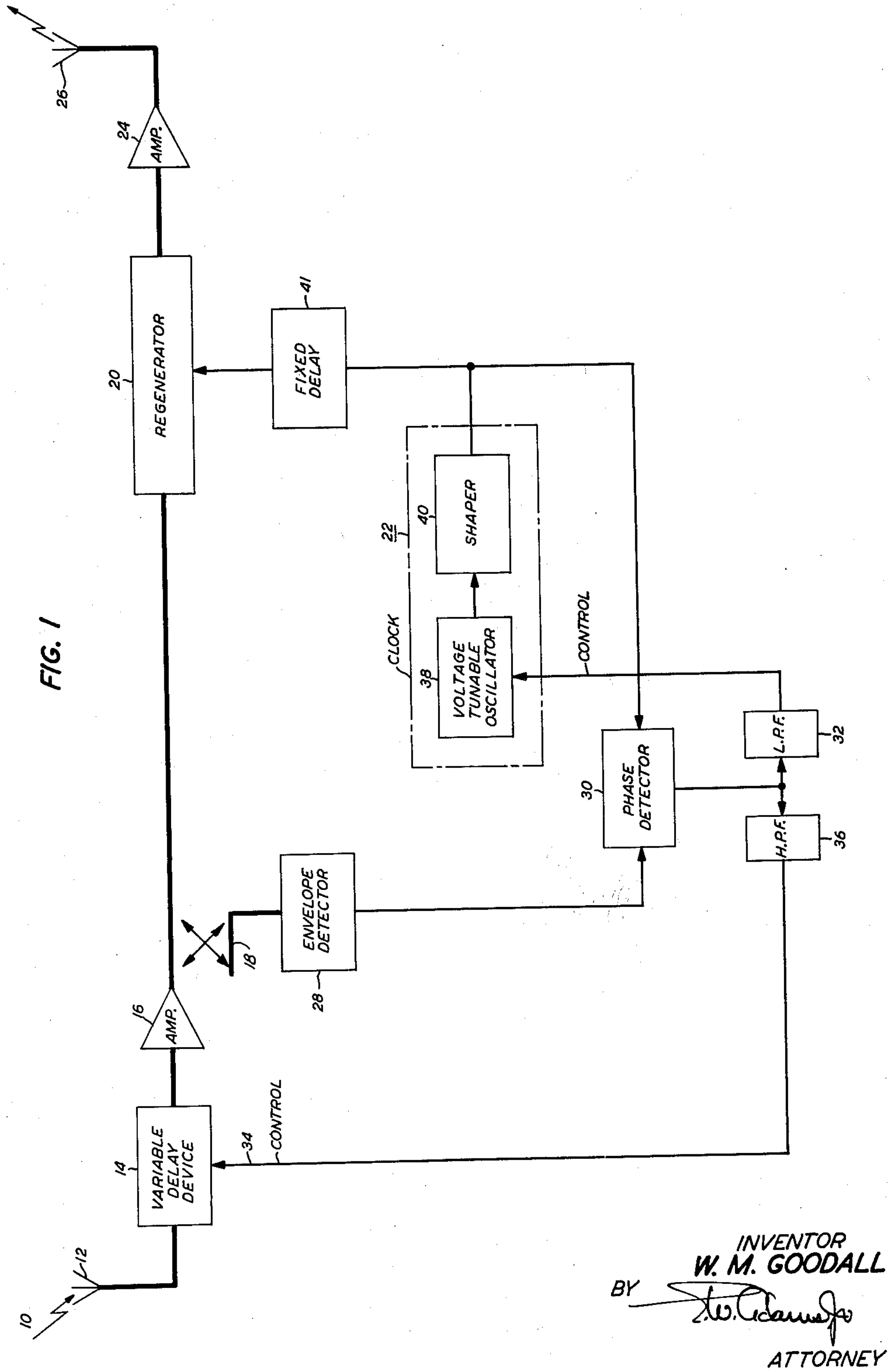
FIG. 1 is a block diagram of a repeater which illustrates the invention.

In the radio frequency repeater of FIG. 1 a radio frequency signal path is shown as a heavy line. Radio frequency pulse information signals 10 which may, for example, be pulse code modulated signals, are intercepted by an input antenna 12 and applied to a variable delay device 14 which introduces delay into the radio frequency signal path under the control of an external correction signal. The delayed information signal is applied to an amplifier 16, after which a sample of the information signal is abstracted by a directional coupler 18 for a purpose to be explained subsequently. The remainder of the information signal is applied to a pulse regenerator 20 where, under the control of timing pulses supplied at the basic repetition rate of the incoming information signal by a local clock 22, the radio frequency pulses are reshaped and retimed. The regenerator disclosed in De Lange Patent 2,868,965 issued January 3, 1959, may advantageously be employed in the capacity of regenerator 20. An amplifier 24 finally increases the level of the regenerated signal to prepare it for retransmission into the medium by an output antenna 26.

A fixed delay 41 is interposed between clock 22 and regenerator 20 to bring the peaks of the timing pulses applied to regenerator 20 into coincidence with the peaks of the radio frequency signal pulses on an average basis. Fixed delay 41, thus, compensates for differences in delay experienced by the signals after splitting at directional coupler 18.

The sample of the radio frequency information signal abstracted by directional coupler 18 is demodulated in a conventional envelope detector 28 and compared in a phase detector 30 with a portion of the timing pulses from local clock 22 to develop a signal whose magnitude is representative of the phase discrepancy therebetween.

Phase detector 30 may, by way of example, be the circuit delineated in FIGS. 12–14 of "Electronic Instruments," Radiation Laboratory Series, vol. 21, McGraw-Hill Book Company, Inc., 1948. In this case, the signal from envelope detector 28 could be applied directly as the error signal and the output of clock 22 could be applied as the reference voltage.

A low-pass filter 32 provides a low impedance path for the low frequency components of the phase difference signal to travel to local clock 22. As further elaborated upon in the prior Goodall patent, the utilization of only the low frequency variations or components of the phase difference signal to control clock 22 results in the locking of the phase of clock 22 to the average, taken over a long period of time, of the incoming pulse information signal, reducing the jitter of the regenerated pulse information signal retimed by the timing pulses. Corrections are thus made to clock 22 to compensate for both error drift of the clock phase and changes in the average incoming pulse information signal.

Simultaneously with the correction of clock 22 by the low frequency variations of the phase difference signal, the high frequency variations are applied by way of a high-pass filter 36 on a lead 34 to variable delay device 14 to control the delay introduced into the radio frequency signal path thereby. Variable delay device 14 delays the pulse information signal sufficiently to maintain alignment between the information and timing pulses despite the presence of jitter on the information signal.

For best results, the cut-off frequency of high-pass filter 36 should be coincident with the cut-off frequency of low-pass filter 32. When the frequency responses of filters 32 and 36 are complementary, as in the case of coincident cut-offs, the whole frequency spectrum of the error signal developed by phase detector 30 may be exploited for control, either of the clock phase or the delay introduced into the radio frequency signal path. This insures close alignment between timing and signal pulses. Furthermore, the two feedback circuits are isolated from one another so that no interaction may take place between them.

High-pass filter 36 in a practical system could be replaced by a broad band-pass filter. Then the low frequency cut-off would remain unaffected and the high frequency cut-off would be determined completely by the system bandwidth. This is an alternative arrangement and not a consideration essential to the invention, however.

The timing pulses from clock 22 are produced by a voltage tunable oscillator 38, as a source of signals, tandemly connected to a shaping circuit 40. Shaping circuit 40 forms timing pulses from the sine wave output of oscillator 38 to the requirements of the particular regenerator 20 which, if a partial regenerator is employed, is the form desired of the regenerated information pulses. It is often found advantageous to transmit information pulses with a "raised cosine" form. To form raised cosine timing pulses, shaping circuit 40 might be a simple base clipper or limiter circuit, described in section 4–3 of "Pulse and Digital Circuits" by Millman and Taub, McGraw-Hill Book Company, Inc., 1956.

Figure 2:
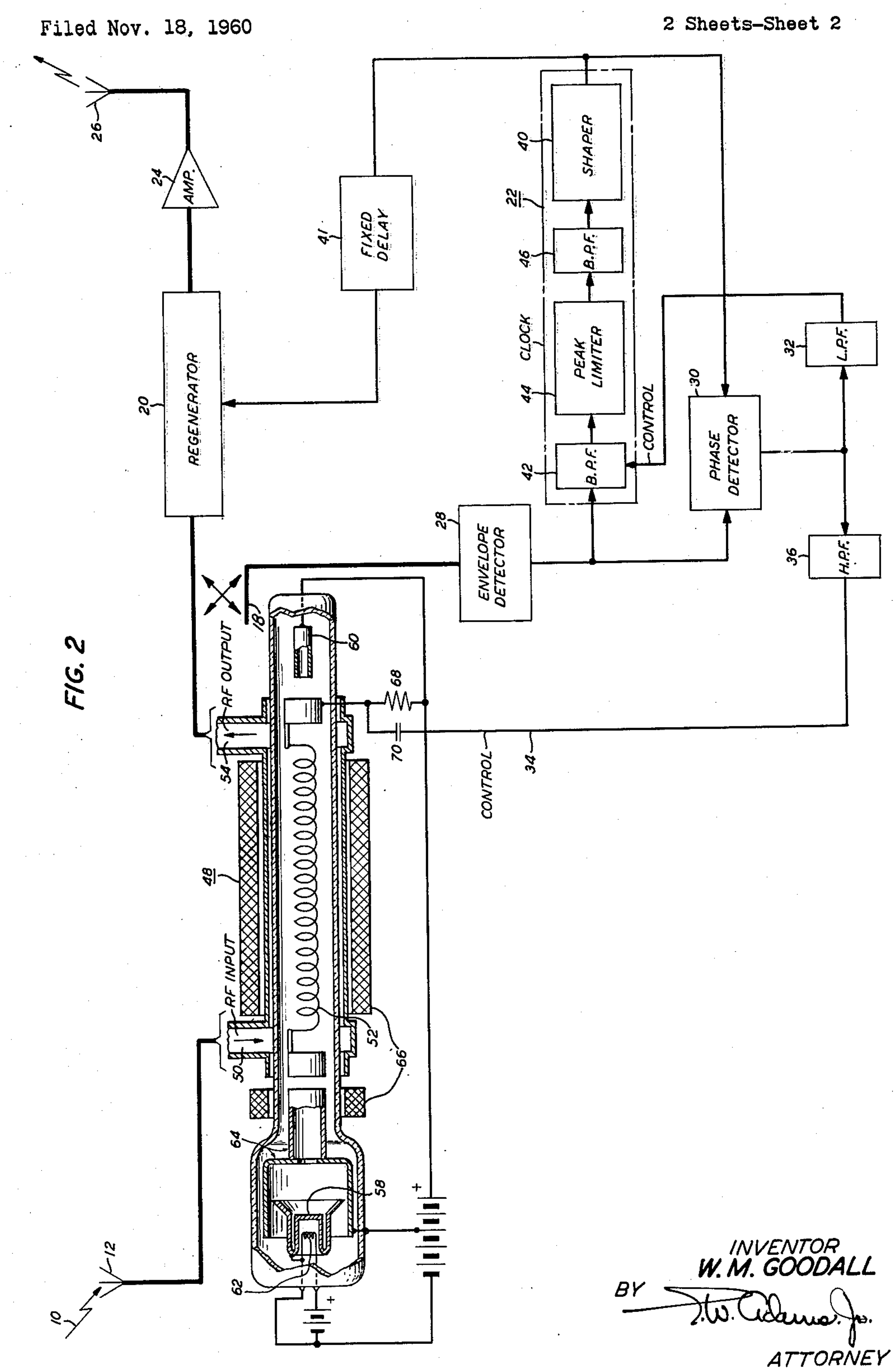
FIG. 2 is a block diagram of a repeater employing an alternative clock arrangement and a traveling wave tube amplifier in the radio frequency signal path.

An alternative circuit arrangement for local clock 22 is illustrated in FIG. 2. In this case, a high Q band-pass filter 42, tuned to the desired clock frequency, is employed to derive an approximate sine wave from the output of envelope detector 28 by frequency selection. A peak limiter 44 removes the amplitude variations from the output of band-pass filter 42, after which a second band-pass filter 46, having a relatively low Q, eliminates the harmonics generated by limiting. The output of band-pass filter 46 has a wave form similar to that of oscillator 38 in FIG. 1, so this signal may be applied to a shaping circuit 40 like the one in FIG. 1 to form the timing pulses for regeneration. As in the case of the oscillator, band-pass filter 42 must be susceptible of tuning correction under the control of an external signal. Since band-pass filter 46 has a very low Q, however, drifts in its frequency are not critical and no control thereof is required.

Also embodied in the circuit of FIG. 2 is a traveling wave tube amplifier 48 which is substituted for variable delay device 14 and amplifier 16 of FIG. 1. Traveling wave tube amplifier 48 performs both the functions of amplification and controlled variable delay required to carry out the invention. The radio frequency signal is applied to an input 50 of traveling wave tube 48, undergoes distributed amplification while traversing a closely wound helix 52 and emerges from an output 54. A heater 62 causes the emission of electrons from a cathode 58, which electrons are formed into a beam by a gun anode 64 maintained at a positive potential with respect to cathode 58. The electron beam (not represented in FIG. 2) is directed through helix 52, being guided to that end by an axial magnetic field produced by focusing coils 66, and terminates at a collector 60, maintained, as is helix 52 at some positive potential with respect to cathode 58. The theory of operation is well known. Briefly, however, the electron beam delivers energy to the radio frequency signal, hence amplifying it during passage through helix 52.

The high frequency control from phase detector 30 is applied to helix assembly 52 on lead 34 by way of a coupling capacitor 70, and appears across a resistor 68. Voltages applied across resistor 68 vary the cathode to helix potential, causing variations in the velocity of the electron beam traveling between cathode 58 and collector 60 and, hence, vary the phase of the information signal as it traverses traveling wave tube amplifier 48.

The lower the cut-off frequency of low-pass filter 32 the less jitter appears in the regenerated information signal. However, the cut-off of low-pass filter 32 in the system is restricted by the stability of clock 22 and the transmission medium. If the cut-off of low-pass filter 32 is too low, the maximum tolerable phase variation of the timing pulses from the information pulses may be exceeded before clock 22 can be corrected. Stated another way, the response of the clock control circuit is too slow to perform the desired correction.

A numerical example may aid in illustrating the relationship between stability and cut-off frequency. If the stability of clock 22, operating at a pulse repetition rate of 160 megacycles, is one in $10^8$ cycles (assume that the transmission medium is at least this stable so that the clock stability is limiting), the maximum drift occurring is 1.6 cycles per second or 576 degrees per second. With a maximum tolerable phase variation of 10 degrees, 57.6 corrections per second to clock 22 are the most that would be required. Therefore, for the given clock stability a cut-off frequency of 100 cycles per second is a safe lower limit to place upon low-pass filter 32. For best results, the cut-off of the high-pass filter should also be at 100 cycles per second. With such a low cut-off of low-pass filter 32 as 100 cycles per second, little jitter appears on the timing pulses and, hence, on the regenerated information signals. Additionally, since high-pass filter 36 takes up where low-pass filter 32 leaves off, complete correction is afforded the system over the whole range of alignment-causing error, while isolation is maintained between the clock and the variable signal delay control circuits.

Although the invention is described in the environment of a radio frequency repeater, it may be practiced in baseband repeaters as well. Or the alignment circuitry of the invention may be found useful in applications other than regenerative repeaters.

What is claimed is:

1. In an automatic correction system, a source of electrical signals, means responsive to an external stimulus for correcting a given characteristic of the signal emanating from said source, a source of standard signals, means responsive to an external stimulus for correcting the same given characteristic of said standard signal, means for developing an indication of the difference between said given characteristic of said electrical signal and said standard signal, means for applying the high frequency variations of said indication as said external stimulus to said signal correcting means, and means for applying the low frequency variations of said indication as said external stimulus to said means for correcting said standard signal.

2. In an automatic correction system, a source of electrical signals, means responsive to an external stimulus for correcting the high frequency variations of a given characteristic of the signal emanating from said source, a source of standard signals, means responsive to an external stimulus for correcting the low frequency variations of the same given characteristic of said standard signal, means for developing an indication of the difference between said given characteristic of said electrical signal and said standard signal, means for applying the high frequency variations of said indication as said external stimulus to said signal correcting means, and means for applying the low frequency variations of said indication as said external stimulus to said means for correcting said standard signal.

3. In an automatic correction system, a source of electrical signals, means responsive to an external stimulus for correcting a given characteristic of the signal emanating from said source, a source of standard signals, means responsive to an external stimulus for correcting the same given characteristic of said standard signal, means for developing an indication of the difference between said given characteristic of said electrical signal and said standard signal, high-pass filter means for applying the high frequency components of said indication as said external stimulus to said signal correcting means and low-pass filter means for applying the low frequency components of said indication as said external stimulus to said means for correcting said standard signal.

4. An automatic correction system as defined in claim 3 in which the cut-off frequency of said high-pass filter is coincident with the cut-off frequency of said low-pass filter.

5. In a system to align incoming pulse information signals with the output of a local source of clock pulses, a source of pulse information signals, variable delay means responsive to an external control signal and connected in tandem with said square, of pulse information a local source of clock pulses susceptible of phase correction, means for comparing the phase of a sample of said information pulses with said clock pulses to obtain an indication of the phase difference, means for applying only the high frequency components of said indication signal to said variable delay means to control the delay introduced therein, and means for applying only the low frequency components of said difference signal to correct the phase of said local source.

6. In a system to align incoming pulse information signals with the output of a local source of clock pulses, a source of pulse information signals, variable delay means susceptible of fast phase correction connected in tandem with said source, a local source of clock pulses susceptible of slow phase correction, means for comparing the phase of a sample of said information pulses with said clock pulses to obtain an indication of the phase difference, means for applying the high frequency components of said indication signal to said variable delay means to control the delay introduced therein, and means for applying the low frequency components of said difference signal to correct the phase of said local source.

7. In a system to align incoming pulse information signals with the output of a local source of clock pulses, a source of pulse information signals, variable delay means responsive to an external control signal and connected in tandem with said source, a local source of clock pulses susceptable of phase correction, means for comparing the phase of a sample of said information pulses with said clock pulses to obtain an indication of the phase difference, high-pass filter means for applying only the high frequency components of said indication signal to said variable delay means to control the delay introduced therein, and low-pass filter means for applying only the low frequency components of said difference signal to correct the phase of said local source.

8. A system to align incoming pulse information signals as defined in claim 7, in which the cut-off frequency of said high-pass filter is coincident with the cut-off frequency of said low-pass filter.

9. In a system to align incoming pulse information signals with the output of a local source of clock pulses, a source of pulse information signals, variable delay means responsive to an external control signal and connected in tandem with said source, a local source of clock pulses comprising an oscillator and shaping means determining the output wave form from said oscillator, means responsive to an external signal for retuning the frequency of operation of said oscillator, means for comparing the phase of a sample of said information pulses with said clock pulses to obtain an indication of the phase difference, means for applying the high frequency components of said indication signal to said variable delay means to control the delay introduced therein, and means for applying the low frequency components of said difference signal to said retuning means to correct the frequency of operation of said oscillator.

10. In a system to align incoming pulse information signals with the output of a source of timing pulses, a source of pulse information signals, variable delay means responsive to an external control signal connected in tandem with said source, means for abstracting a portion of the information pulses, a source of timing pulses comprising a band-pass filter and shaping means tandemly connected, means responsive to an external signal for retuning the resonant frequency of said band-pass filter, means for applying said portion of said information pulses to said band-pass filter, means for comparing the phase of a sample of said information pulses with said timing pulses to obtain an indication of the phase difference, means for applying the high frequency components of said indication signal to said variable delay means to correct the delay introduced therein, and means for applying the low frequency variations of said indication signal to said retuning means to correct the resonant frequency of said band-pass filter.

11. A self-timed regenerative repeater comprising a source of pulse information signals, means responsive to an external control signal for introducing a fast acting variable delay in the information signals from said source, a local source of clock pulses susceptible of slow acting correction, means for comparing the phase of a sample of said information pulses with said clock pulses to obtain an indication of the phase difference, means for applying the high frequency components of said indication signal as said external control signal to said variable delay means, means for applying the low frequency components of said indication signal to correct said local source, and means regulated by said clock pulses for regenerating the delayed information signals.

12. A self-timed regenerative repeater comprising a source of signal to be regenerated, means for applying said signals to a variable delay device, a local source of clock pulses, means responsive to an external signal for correcting the phase of said local source, means for comparing the envelope of the output of said variable delay device with said local clock pulses to develop a phase difference signal, means for separating the high frequency variations of said phase difference signal, means for applying said high frequency variations as a control signal to vary the delay introduced by said variable delay device, means for separating the low frequency variations of said phase difference signal, means for applying said low frequency variations as a control voltage to said correcting means of said local source, and means regulated by said clock pulses for regenerating the pulse signals present at the output of said variable delay device.

13. A self-timed regenerative repeater comprising a signal path including in the order recited, an input circuit, a variable delay device, means for abstracting a portion of the signal present on said signal path, means controlled by timing pulses for regenerating signals present on said signal path, and an output circuit, a source of timing pulses, means for applying a portion of said timing pulses to control said regenerating means, means for comparing the phase of a second portion of said timing pulses with that of the envelope of said portion abstracted from said signal path to develop a phase-dependent difference signal, high-pass filter means for applying only the high frequency variations of said difference signal to control the delay introduced by said variable delay device and low-pass filter means for applying only the low frequency variations of said difference signal to correct the repetition rate of said timing pulse source.

14. A self-timed regenerative repeater comprising a source of radio frequency pulse information signals, a traveling wave tube amplifier, means for applying said signals to the input of said traveling wave tube amplifier, a local source of clock pulses, means for comparing the envelope of the amplified output signal from said traveling wave tube amplifier with said clock pulses to obtain a signal indication of the phase difference, means for applying at least the high frequency variations of said indication signal to said traveling wave tube amplifier to change the bias between the helix and cathode thereof in order to change the delay undergone by said information signal in traversing said traveling wave tube amplifier, and means regulated by said clock pulses for regenerating the delayed information signals.

15. A self-timed regenerative repeater comprising a source of radio frequency pulse information signals, a traveling wave tube amplifier, means for applying said information signal to the input of said traveling wave tube amplifier, a local source of clock pulses susceptible of correction, means for comparing the envelope of the output from said traveling wave tube amplifier with said clock pulses to obtain a signal indication of the phase difference, means for applying at least the high frequency variations of said indication signal to said traveling wave tube amplifier to vary the bias between the helix and cathode thereof to change the delay undergone by said information signal in traversing said traveling wave tube amplifier, means for applying only the low frequency variations of said indication signal to correct said local source, and means regulated by said clock pulses for regenerating the delayed information signals.

References Cited in the file of this patent

UNITED STATES PATENTS

| | | |
|---|---|---|
| 2,744,960 | Greefkes et al. | May 8, 1956 |
| 2,957,943 | Rack | Oct. 25, 1960 |